Nov. 10, 1970 — H. R. SPROUL — 3,539,471
WATER DETECTING ELEMENT
Filed Oct. 23, 1965 — 2 Sheets-Sheet 1
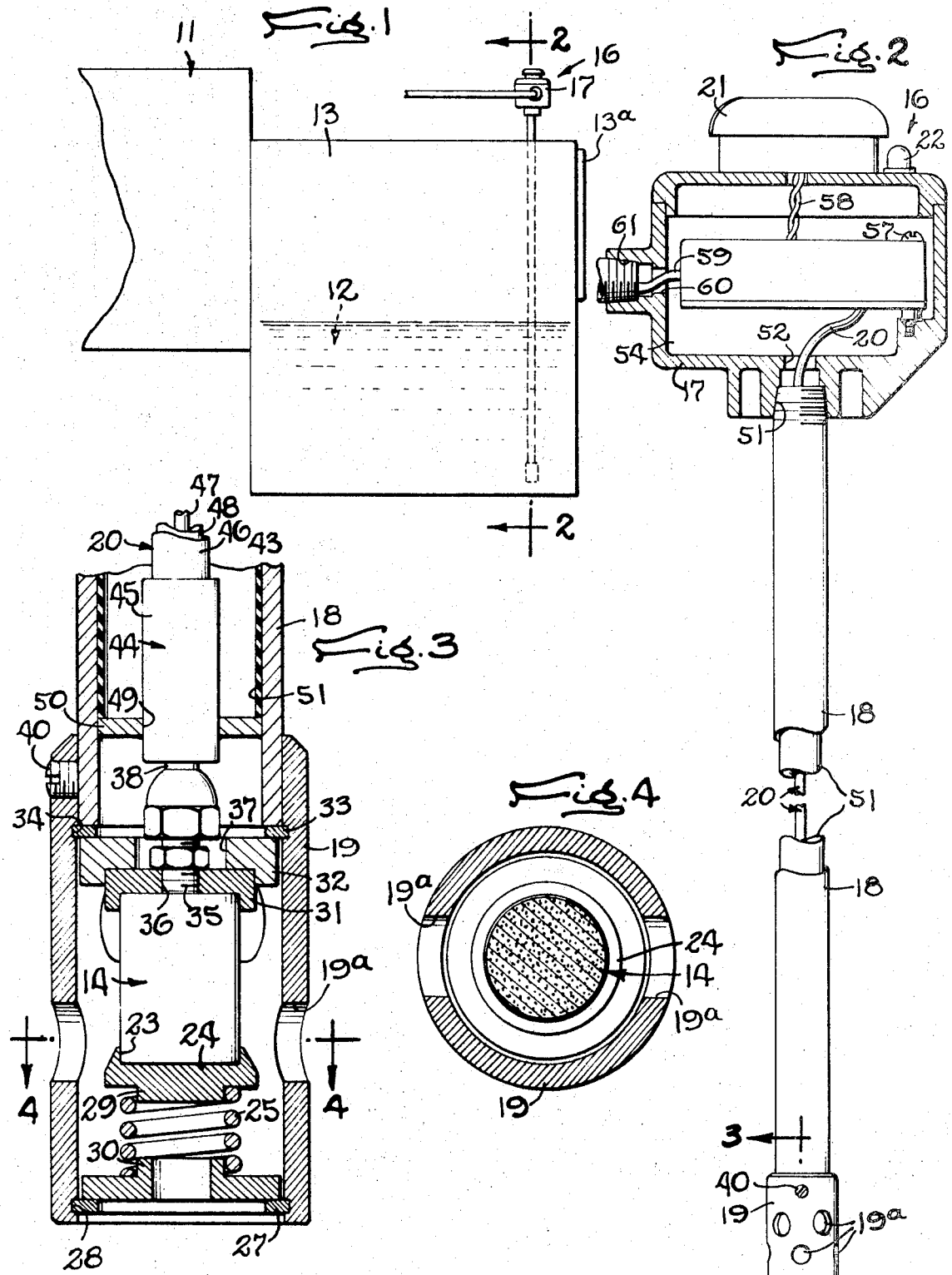
INVENTOR
Hugh R. Sproul
by Wolfe, Hubbard, Voit & Osann
ATTORNEY

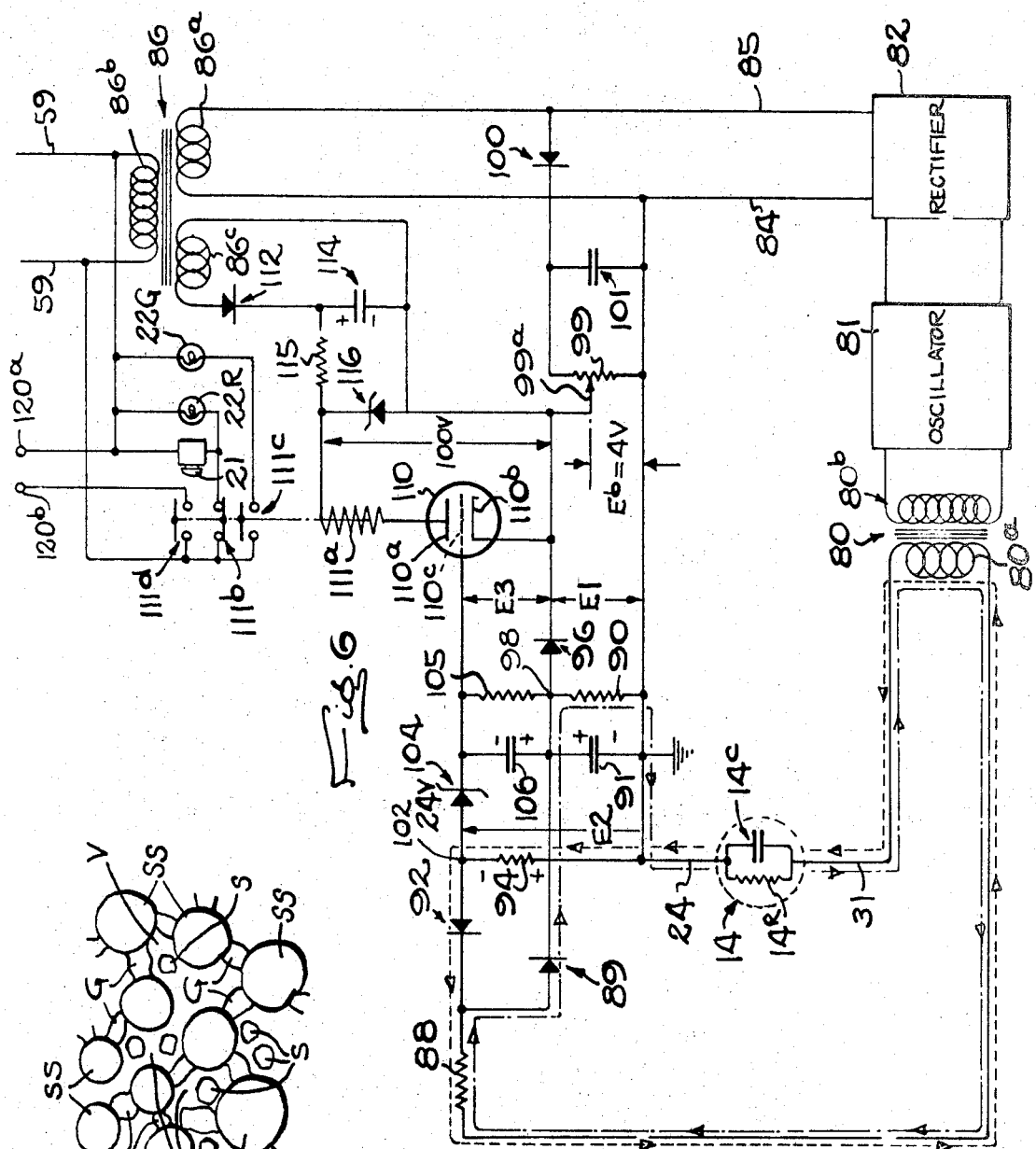

| United States Patent Office | 3,539,471 |
|---|---|
| | Patented Nov. 10, 1970 |

3,539,471
WATER DETECTING ELEMENT
Hugh S. Sproul, Rockton, Ill., assignor, by mesne assignments, to Alco Standard Corporation, Philadelphia, Pa., a corporation of Ohio
Filed Oct. 23, 1965, Ser. No. 504,035
Int. Cl. H01b 1/06
U.S. Cl. 252—513                                    2 Claims

ABSTRACT OF THE DISCLOSURE

A probe for use in connection with an electrical monitor circuit for detecting the presence of water in an oil bath which includes a conduit that is submerged into the oil bath, a hollow casing attached to the submerged end of the conduit which is provided with openings communicating with the oil bath, a pair of spaced electrodes mounted in the casing and a sensing element positioned between the spaced electrodes. The sensing element consists of a porous mass with globules of stainless steel and glass with the interstices being at least partially filled with potassium nitrate particles. When water passes through the holes in the casing and contacts the sensing element, the potassium nitrate is ionized and reduces the electrical resistance in the porous mass which can then be detected in the monitor circuit.

---

This invention relates to apparatus for detecting water in a fluid, and more particularly, to such an apparatus for detecting small quantities of water in such fluids as the hot oil used for quenching workpieces passing from a heat treating furnace.

The oil of a quenching bath is frequently heated to high temperatures thus giving rise to the danger of an explosion resulting from minute amounts of water which may be mixed with the quenching oil. Any water which may be present in the oil, as the latter is heated sufficiently, will vaporize and bubble to the surface. The steam bubbles carry with them small quantities of oil vapor which is mixed with the air above the oil surface. The resulting oil vapor atmosphere when mixed with oxygen is very combustible. But so long as there is only the limited amount of oxygen already present in the furnace, there is little danger of an explosion. However, when the door of the cabinet housing the oil bath is suddenly opened to allow entry of fresh air and more oxygen, the air-oil mixture can ignite and burn with explosive intensity resulting extreme damage to the equipment and possible injury to the operating personnel.

Only very minute quantities of water in the oil, in the order of less than 1% by volume, can result in generating such a combustible atmosphere. Further, it is difficult to keep out such small amounts of moisture since condensation, breakage of cooling lines and many other occurrences can result in considerable quantities of water being introduced into the oil bath. Therefore, it is highly desirable to constantly monitor the oil bath and signal when a minute quantity of water is mixed with the oil. Previously unsolved problems have arisen in devising moisture detecting apparatus due to the conflicting requirements that any sensing element must withstand the high temperatures to which the oil bath is heated, sometimes in the order of 300 to 500 degrees Fahrenheit, and yet must be sensitive enough to detect such small quantities of water. For instance, in some prior detectors the sensing element is frequently washed away or dissolved by the hot circulating oil thus causing the detector to indicate that no water is present in the oil when in fact the detector is itself inoperative.

Accordingly, the general object of this invention is to provide a new and improved apparatus for sensing very minute quantities of water in a fluid mixture and which includes means for detecting and signaling when the apparatus itself is inoperative and thereby incapable of signaling the presence of water in the fluid.

A further object of this invention is to provide a moisture sensing element which when immersed in a fluid will indicate the presence of minute quantities of water in the fluid and which will withstand without deterioration such high temperatures as those encountered in a quenching oil bath.

Still another object of this invention is to provide a moisture sensing element for use with a moisture monitoring apparatus and possessing separate physical properties which do not change in value when the element is subjected to high temperatures, those properties being measurable to indicate both (1) that the element is operatively connected to the apparatus and (2) that minute quantities of moisture are not present in the fluid to which the element is exposed.

Another object of this invention is to provide a moisture sensing element for use with a moisture monitoring apparatus which may be conditioned for reuse after being exposed to a quantity of moisture sufficient to trigger the apparatus.

A more specific object of this invention is to provide a moisture monitoring electrical circuit for use with a moisture sensing element possessing measurable electrical properties of resistance and capacitance, which circuit includes a signal means for indicating (1) when either the circuit or the element is inoperative, and (2) when the resistance of the element has changed sufficiently to indicate exposure of the element to small concentrations of water.

Other objects and advantages of this invention will become apparent from the following detailed description taken in connection with the accompanying drawings, in which FIG. 1 is a fragmentary view of a heat treating furnace and oil bath for quenching parts treated therein, the bath being equipped with a moisture monitor embodying the invention.

FIG. 2 is an enlarged partial cross-sectional view of the moisture monitor taken along the line 2—2 of FIG. 1, FIG. 3 is an enlarged fragmentary view taken along the lines 3—3 of FIG. 2 of the moisture sensing element mounted in the monitor, FIG. 4 is a cross-sectional view taken along the line 4—4 of FIG. 3, FIG. 5 is a sketch of a greatly enlarged cross-section of a portion of the moisture sensing element, and FIG. 6 is a schematic diagram of the electrical circuit of the moisture monitor.

As shown in the drawings, the invention is adapted for use with a heat treating furnace 11 in which workpieces are heated to a very high temperature. An oil bath 12 contained in a closed cabinet 13 is positioned immediately adjacent the furnace for receiving and quenching workpieces after they have been heated, the workpieces being subsequently removed through a door 13a. While not shown, a heater is generally provided for maintaining the oil at a temperature of between 130 and 500 degrees Fahrenheit, and as explained before, it is extremely important for safety reasons to constantly monitor the quenching oil bath and signal the presence of very minute quantities of water which may be present therein so precautionary steps can be taken to shut down the furnace and remove such water.

In accordance with the present invention, an immersible moisture sensing element is made of globules of an electrically conductive material held together in a porous mass by interconnecting globules of a dielectric material and containing particles of a water soluble salt interspersed in the interstices between the globules of conductive and dielectric materials. Since the conductive globules are held in limited contact with each other in being separated by the dielectric globules, the element exhibits both electrical resistance and capacitance measured between electrodes or terminals engaged with spaced surface areas. By monitoring the capacitance of the element, it can be determined that the element is operably connected to a detecting apparatus. When even minute quantities of water are present in the pores, a quantity of the salt is dissolved to form an ionized solution serving as a low resistance, electrically-conductive path through the sensing element. By monitoring the electrical resistance of the element for detecting the resulting substantial change in resistance, the presence of moisture in the fluid to which the element is exposed can be detected.

Accordingly, as shown in FIGS. 3-5, a sensing element 14 is provided which is immersed in the oil bath for detecting water in the oil. In one exemplary embodiment, this element is made by mixing 300 mesh powdered stainless steel with powdered glass and powdered potassium nitrate, these constituents forming the electrically conductive material, the dielectric material and the salt, respectively. Water is added to the mix to form a paste which then is placed in a suitable press and extruded in rod form under a sufficiently high pressure to squeeze out the moisture. When subjected to such a high pressure, the stainless steel has been found to take the form of individual globules or balls of a generally spherical configuration suspended in the mixture.

The rod is now cut into lengths to form individual sensing elements. One suitable size of an element is cut about three-fourths of an inch long from a rod one-half inch in diameter. These individual elements are now heated to approximately 800 to 900 degrees Fahrenheit for a sufficient time to soften the glass particles so they fuse to the globules of stainless steel leaving interstices or pores therebetween. Thus, as shown in FIG. 5 a mechanially strong but highly porous element 14 is formed with particles of a salt S interspersed in the interstices V between the glass globules G and stainless steel globules SS.

In use, the initial electrical resistance of the element between two spaced surface areas, here its opposite end surfaces, is quite high since the current conducting paths between the globules of the electrically conductive stainless steel are broken up by the globules of the glass dielectric material. When the element is immersed in a fluid containing no water, such as a quenching oil bath, the resistance remains substantially constant since fluids other than water will not dissolve the salt and become ionized.

However, in accordance with one aspect of the invention, the resistance exhibited by the sensing element is continuously sensed, and any substantial reduction in such resistance is caused to signal the presence of water. With the introduction of as little as 0.1% by weight of water into the fluid, the salt acts to absorb or draw out the water as the oil enters the interstices of the porous element. The salt, in going into solution, ionizes in the water to create a low reistance electrically conductive path between the globules of stainless steel. Thus, the electrical resistance of the element is lowered to only a fraction of its original value.

In accordance with another aspect of the invention, the element is made to exhibit properties of capacitance, which property can be constantly monitored to indicate that the element is operably connected to the means for monitoring the electrical resistance thereof. This capacitance property is derived from the utilization of the glass, a dielectric, to hold the globules of stainless steel in spaced relationship in the manner of the plates of a capacitor. Thus, the element conducts an alternating current, which conduction may be monitored to ascertain the presence of the element in the monitoring circuit.

After the element has been subjected to a quantity of water sufficient to lower its electrical resistance and signal the presence of water, it may be conditioned for reuse. This is accomplished by heating the element to a sufficiently high temperature to evaporate out the moisture, thereby leaving the salt in the interstices, ready again to cause ionization of any water entering the element. Such reconditioning may be hastened by passing an electrical current through the element to assist in heating it.

While stainless steel power has been mentioned in the foregoing example, other electrically conducting materials may be used. The conducting material should preferably be a corrosion resistant metal, with other suitable examples being chromium and molybdenum. Also, other dielectric materials such as various types of plastic can be used. It is important that the dielectric material have a high enough melting point to be immune from softening or flowing when heated to the temperatures of the oil bath or other fluid in which the element is immersed for detecting water. The salt should be of a type which neither melts nor becomes electrically conductive when heated to the temperatures of the oil bath or fluid in which the element is used, which is insoluble in the oil bath or fluid that the moisture being detected is mixed with, and which is soluble to some extent in water to ionize the latter.

To utilize a sensing element of the type designed, provision is made to hold it immersed in the bath and to connect it with an electric circuit which is responsive to the impedance between spaced areas thereon. As shown in FIG. 1 through 4, a monitoring apparatus 16 is supported on the oil bath cabinet 13 with a housing 17 extending above and outside the cabinet. A conduit 18 projects through an opening in the top of the cabinet and down into the quenching oil where a hollow casing 19 holds a sensing element 14 of the type just described. Within the housing 17 is an electrical device (shown in the FIG. 6) which is connected to the element 14 through an electric cable 20 for detecting and signaling when the capictance or resistance of the element is abnormal. Mounted on top the housing are such signaling devices as a bell 21 and a pair of electric lamps 22r and 22g which signal the operating condition of the monitoring apparatus.

The sensing element 14 is exposed to the oil bath through openings 19a in the side of the casing 19 so the fluid can circulate freely therethrough. The lower end of the element is held firmly within a well 23 in a contact member or electrode 24 which is biased upwardly by a compression spring 25 extending from a bottom end wall 26. The end wall is held in place by a snap ring 27 fitted into a groove 28 in the casing inner wall. The spring is clamped snugly over projections 29 and 30 on the contact member and end wall, respectively, for forming a good electrical connection between the element and the casing. The top of the element is telescoped into a second contact member or electrode 31 fixed to a ceramic insulator 32 forming the top end wall of the casing. The insulator rests against a snap ring 33 fitted into a groove 34 in the casing inner wall. A bolt 35 screwed into the threaded opening 36 in the second contact member extends upwardly through a center opening 37 in the ceramic insulator and supports at its top end a male electrical connector 38. The casing is fixed to the conduit 18 by slipping the top end thereof over the lower end of the conduit. A set screw 40 is then tightened to hold the casing and conduit together.

The conduit 18 is formed as a long cylindrical tube having a center opening 43 through which the electrical cable 20 extends. This cable is attached at its lower end to a female connector 44 and includes an outer insulating sheath 45 covering an electrical shield 46 through which a conductor 47 passes supported within an insulating layer 48. The cable extends through a center opening 49 in a washer 50 sealing the bottom of the conduit and abutting against the lower end of an insulating lining 51 inside the conduit.

The top end of the conduit is screwed into a threaded opening 51 (FIG. 2) in the bottom wall of the control housing 17. The cable 20 extends through an opening 52 into the interior cavity 54 of the control housing where it connects with an inner housing 56 held in place by a bolt 57 and containing the electrical device of the monitoring apparatus. This cable, the conduit 18 and the spring 25 thus form an electric circuit connecting the element with the electrical device in the inner housing. Wires 58 connect the device in the inner housing to a belt 21 and lights 22r and 22g, while a second pair of wires 59 lead through an opening 60 and a conduit 61 to a power supply (not shown), preferably 110 volts AC.

In accordance with the present invention, provision is made to continuously monitor the electrical impedance exhibited by the immersed sensing element 14 in an electrical circuit and to actuate a signaling device either (a) when the impedance is greater than the normal maximum value exhibited in the presence of a substantially pure non-ionizable fluid, or (b) when the impedance is less than a predetermined value, which is lower than the normal maximum value. Thus, the existence of an abnormal and potentially dangerous condition is signaled either (a) when the sensing element has become disconnected from the monitoring circuit or is inoperative, or (b) when the bath contains more than a predetermined concentration of the ionizable liquid.

As here shown in FIG. 6, these objectives are achieved by connecting the sensing element 14, through its electrodes 24 and 31, in an electrical monitoring circuit which includes a voltage source. In the present instance, the source voltage is induced in the secondary winding 80a of a transformer 80 having its primary winding 80b energized by an oscillator 81 which operates at a relatively high frequency, such as 5 kilocycles. The oscillator receives as its power input a DC voltage produced by a rectifier 82 energized with the AC voltage appearing between conductors 84, 85 connected to the secondary winding 86a of a power transformer 86 having its primary winding 86b excited from the 110 voltage source via conductors 59.

As shown in FIG. 6, the monitoring circuit which includes the sensing element 14 has the parallel combination of a resistor 14R and a capacitor 14C (these representing the resistance and capacitance of the elements) in series with the secondary winding 80a and a voltage dropping resistor 88. From the lower end of the resistor 88 the circuit branches into two paths, the first formed by a rectifying diode 89 and the parallel combination of a resistor 90 and a smoothing capacitor 91 which lead back to the ground conductor 84 and the electrode 24. The second path is constituted by a rectifying diode 92 and a resistor 94. Because the diodes 89 and 92 are oppositely poled, current flows through these two paths during the opposite half cycles of the AC voltage induced in the secondary winding 80a.

As indicated above, the resistor 14R has a relatively high value when the element 14 is immersed in substantially pure oil containing no water, but the parallel capacitor 14C makes the net reactive impedance of the parallel R-C circuit take on a finite normal maximum value. Therefore, even when no water is in the monitored oil bath the impedance created by the sensing element in the monitoring circuit will permit some current flow during both positive and negative half cycles of the source voltage, thereby creating a rectified and smoothed DC voltage across the resistor 94. If, however, the sensing element 14 is fractured or partially destroyed, or if it is disconnected from the circuit, the impedance in the monitoring circuit will be markedly greater than the normal maximum value.

On the other hand, when the concentration of ionizable liquid, e.g., water, in the oil bath increases from zero, the value of the resistor 14R decreases, as previously explained. Thus, the net impedance exhibited by the sensing element varies inversely with the concentration of water in the oil bath, and decreases as that concentration increases. Since the AC source voltage induced in the secondary winding 80a is substantially constant in amplitude, the current flow in the monitoring circuit will thus increase as the water concentration increases.

For this purpose of detecting when the element is inoperative or disconnected, means are associated with the monitoring circuit for producing the first signal or voltage which has a given maximum level under normal conditions, but which falls below that level when the circuit impedance increases above the normal maximum value. In the present embodiment, this is accomplished by current flow during positive half cycles of the source voltage through the diode 89 (as indicated by dashed line arrows in FIG. 6) which tends to charge the capacitor 91 during each positive half cycle and thus to produce a smoothed DC voltage E1 thereacross. During negative half cycles of the source when the diode 89 is not conductive, the resistor 90 in parallel with the capacitor 91 permits the latter to discharge slowly.

The voltage E1 which appears with the indicated polarity across the capacitor 91 tends to reach a relatively high value, of, say, 8 volts, but it is clamped and limited to a predetermined maximum level of, say, 4 volts. For this purpose, a clamping diode 96 is connected with the indicated polarity from the junction 98 to a source of biasing voltage $Eb$ which appears between the wiper 99a and the lower end of a potentiometer 99. The direct biasing voltage $Eb$ is derived by a half wave rectifying diode 100 connected in series with the potentiometer 99 between the lines 85 and 84, there being a smoothing capacitor 101 in parallel with the potentiometer. Assuming that the wiper 99a is adjusted to make the voltage $Eb$ equal to 4 volts with the indicated polarity, the clamping diode 96 will conduct whenever the signal voltage E1 tends to exceed 4 volts, thereby limiting the latter to a maximum magnitude of 4 volts. If the impedance in the monitoring circuit increases substantially above the normal maximum value, however, the voltage E1 will decrease below the maximum 4 volt level.

Further in carrying out the invention, means are provided to create a second signal or voltage which varies inversely with the impedance created in the monitoring circuit by the sensing element 14. As noted above, on negative half cycles of the voltages induced in the secondary winding 80a, current flows (as indicated by the dotted line arrows in FIG. 6) through the diode 92 and the resistor 94 to create across the latter (between a junction 102 and the ground conductor 84) a half wave pulsating voltage E2 of the polarity shown, the peak value of that pulsating voltage varying inversely with the monitored impedance and directly with the concentration of water in the oil bath. Just by way of example, it may be assumed that the peak value of the voltage E2 is 20 volts when no water is present in the oil bath, and increases to, say, 30 volts as the water concentration rises from zero to 0.1 percent. On the other hand, if the element 14 becomes disconnected from the monitoring circuit, the peak value of the voltage E2 will decrease to zero, but this in itself will have no effect.

In order to produce a third signal or voltage which varies according to the amount by which the second signal exceeds a predetermined threshold value, and thus which comes into existence only when the water concentration exceeds a predetermined threshold concentration, a Zener diode 104 is connected with the polarity shown from the junction 102 through a paralleled resistor 105 and capacitor 106 to the junction 98. The Zener diode is thus reversely biased and under normal conditions will not conduct, so a DC signal voltage E3 appearing across the capacitor 106 will normally be zero. That is, assuming that the junction 98 is at +4 volts relative to ground, and that the Zener diode has a 24 volt breakdown value, then the Zener diode will not conduct reversely so long as the peak value of the pulsating voltage E2 is less than —28 volts relative to ground. As that peak value tends to increase above 28 volts in magnitude, however, the Zener diode 104 will break down and conduct reversely, thereby to charge the capacitor 106 with a voltage of the indicated polarity and here labeled E3. The voltage E3 is a substantialy smooth DC voltage because the capacitor 106 cannot discharge through the resistor 105 as rapidly as it charges on successive half cycles when the Zener diode breaks down. If the voltage E2 has a peak value of 30 volts on successive pulses, the capacitor 106 will be charged to produce a voltage E3 having a value of approximately 2 volts.

As previously explained, two signaling devices in the form of a red light 22r and an alarm bell 21 are employed to signal the existence of a potentialy dangerous condition. In order to actuate those devices either (a) when the first signal voltage E1 decreases below its normal maximum level, or (b) when the second and third signals E2 and E3 increase to predetermined magnitudes, the signals E1 and E3 are conected in the input circuit for a controlled discharge device, there shown as a vacuum tube triode 110, which in turn controls the actuation of a relay 111. The coil 111a of the relay is conected in series with a DC supply voltage between the anode 110a and the cathode 110b of the triode. The DC supply voltage is derived from a rectifying diode 112 in series with a smoothing capacitor 114 across a secondary winding 86c of the power supply transformer 86. A resistor 115 and a Zener diode 116 have a 100 volt breakdown value are connected across the capacitor 114, so that the voltage appearing across the Zener diode, and which serves as the operating voltage for the triode 110, remains substantially constant at 100 volts.

To control the conduction of the triode, the voltage between its grid 110c and its cathode 110 b is determined by the sum of the biasing voltage $Eb$, the first signal voltage E1, and the third signal voltage E3. It will be seen that the voltages $Eb$, E1 and E3 are connected in series between the cathode 110b, and the grid 110c, so that the grid potential, relative to the cathode, is determined by the algebraic sum of such voltages. Under normal circumstances the voltage E3 across the capacitor 106 is zero because the peak value of the voltage pulses E2 appearing across the resistor 94 is not sufficiently great to cause conduction of the Zener diode 104. Also under normal circumstances, the voltages $Eb$ and E1 are equal in magnitude (for example, at about 4 volts) but opposite in polarity, so the grid-cathode voltage is substantially zero. Absent a large negative bias on the grid 110c, the triode 110 conducts heavily and energizes the relay coil 111a. As a result, under these normal conditions, normally closed contacts 111b are opened to deenergize the lamp 22r and the alarm bell 21. Normally open contacts 111c of the relay 111 are closed to energize the "normal" indication lamp 22g from the AC voltage supply lines 59. And normally open relay contacts 111d are closed to complete a circuit between terminals 120a and 120b which may be connected in a safety circuit associated with the furnace 11 and the heating apparatus for the bath 10, leaving the latter in normal operation.

If now the sensing element 14 should become disconnected from the monitoring circuit or should become broken and partially destroyed, so that the capacitor 14c is removed from the monitoring circuit or reduced in value, the sensed impedance would be substantially increased. This reduces the peak value of the voltage E2 appearing across the resistor 94, but that in itself is of no consequence More importantly, the increase in impedance in the monitoring circuit reduces the magnitude of the signal voltage E1 to which capacitor 91 is charged, so that the algebraic sum of the biasing voltage $Eb$ and the voltage E1 places a negative potential on the grid 110c (relative to the cathode 110b), thus driving the triode 110 to cut off and deenergize relay coil 111a. When this occurs, the relay contacts 111b close to energize the alarm lamp 22r and the alarm bell 21 by connecting them between the AC supply line 59; the relay contacts 111c open to deenergize the "condition normal" green lamp 22g; and the relay contacts 111d open to interrupt any safety circuit connected to the terminals 120a and 120b, so that the furnace 11 and the heating device for the oil bath 10 are automatically turned off. To give a specific example, let it be assumed that due to an increase in the impedance exhibited by the sensing element 14 the voltage E1 falls to a magnitude of 2 volts. As a result, the algebraic sum of the 4 volt biasing signal and the 2 volt signal E1 will place a —2 volt bias on the grid 110c, thereby driving the triode 110 to cutoff. Thus, whenever the first signal voltage E1 drops substantialy below its normal maximum value (here described as 4 volts) the triode 110 is rendered non-conductive and the relay 111 controlled thereby actuates the signaling devices 22r and 21 to indicate an abnormal and potentially dangerous condition, viz, the fact that the sensing element has been disconnected, broken, or otherwise rendered inoperative to signal the presence of water in the oil bath.

On the other hand, if the impedance of the sensing element 14 is originally normal because the value of the resistor 14r is high due to the absence of appreciable water in the oil bath, then the circuit conditions are normal and the first signal E1 has a value of approximately 4 volts with the third signal E3 being substantially zero because the pulsating signal E2 does not reach peak amplitudes sufficiently great to cause breakdown of the Zener diode 104. If now water is for any reason introduced in the oil bath so that the value of the resistor 14r decreases, the net impedance of the sensing element 14 will decrease. This will not increase the magnitude of the first voltage E1 because the latter is clamped by the diode 96 to a maximum value, of, say, 4 volts. However, the peak values of the voltage E2 will progressively increase as the water concentration increases, and when these peak values exceed 28 volts, then the Zener diode 104 will be rendered conductive momentarily during each half wave pulse of the voltage E2. If the peak value of the voltage E2 increases, to, say, 30 volts, then it will result in current flow from the junction 98 (residing at a +4 volt potential) through the capacitor 106 and reversely through the Zener diode 104. Accordingly, the capacitor 106 will be progressively charged until the voltage E3 thereacross reaches a magnitude of 2 volts with the polarity shown. When this occurs, the algebraic sum of the biasing voltage $Eb$, the first voltage E1, and the third voltage E3 places the grid 110c at a negative, cutoff potential relative to the cathode 110b. Anode currents through the triode 110 ceases, the relay 111 is deactuated, and the alarm signaling devices 22r and 21 are actuated in the manner previously described. By suitable choice of the circuit parameters, this cutoff of the triode 110 and deenergization of the relay 111 may be made to occur in response to the water concentration in the oil bath reaching a predetermined percentage.

It is noteworthy that the apparatus as here described is self-checking or "fail safe" in its organization and operation. Any failure in the triode power supply, or in the other circuit components will result in the triode 110 being rendered non-conductive, so that the relay 111 drops out and energizes the alarm devices 22r and 21. If for any reason the circuit switch acting to create the voltage E1 is disabled, then the bias voltage $Eb$ will be sufficient to place the grid 110c at its cutoff potential, so that an abnormal and potentially dangerous condition will be signaled. Moreover, an alarm is signaled either if the sensing element is disabled, disconnected, or otherwise rendered inoperative, or when the reduced value of the sensing element resistance $14r$ indicates that water in greater than a predetermined minute concentration exists in the oil bath. As a result of these features, the sensing element and the electrical device utilizing the same characteristics as described above constitutes a very sensitive but reliable monitor for indictaing the existence of potentially dangerous conditions. While the present invention has been described with specific reference to detecting the presence of water in a heated oil bath, it will be understood by those skilled in the art to have other advantageous applications in detecting or monitoring the existence of small concentrations of ionizable fluids in bodies or baths of nonionizable fluids.

I claim as my invention:

1. A sensing mechanism having a sensing element for detecting the presence of water in an oil bath, said sensing element consisting essentially of a cylindrical porous mass consisting of globules of stainless steel and globules of glass, said porous mass having interstices between said globules, said glass globules serving to sufficiently separate said stainless steel globules so as to break up the paths for electric current flow directly through said porous mass and to create substantial electrical resistance between spaced points on the porous mass, and potassium nitrate particles interspersed in said interstices between the stainless steel and glass globules, the potassium nitrate particles being present in sufficient amount to significantly reduce the electrical resistance upon being ionized when contacted with less than about 1% by volume of water in the oil bath.

2. A sensing element for detecting the presence of water in a high temperature oil bath, said sensing element consisting essentially of a cylindrical porous mass consisting of globules of stainless steel and globules of glass, said stainless steel and glass globules having melting points substantially above the temperature of the oil bath, said porous mass having interstices between said globules, said glass globules serving to sufficiently separate said stainless steel globules so as to break up the paths for electric current flow directly through said porous mass and to create substantial electrical resistance between spaced points on the porous mass, and potassium nitrate particles interspersed in said interstices between the stainless steel and glass globules, the potassium nitrate particles being present in sufficient amount to significantly reduce the electrical resistance upon being ionized when contacted with less than about 1% by volume of water in the oil bath.

References Cited

UNITED STATES PATENTS

| | | | |
|---|---|---|---|
| 2,617,972 | 11/1952 | Nutter | 338—35 XR |
| 2,683,673 | 7/1954 | Silversher | 117—71 |
| 3,056,935 | 10/1962 | Jensen | 338—34 |

JOHN D. WELSH, Primary Examiner

U.S. Cl. X.R.

338—35, 224; 252—508, 518